United States Patent

Weaver et al.

[15] 3,689,501
[45] Sept. 5, 1972

[54] ANTHRAQUINONE COMPOUNDS CONTAINING A TRIAZOLYLTHIO GROUP

[72] Inventors: Max A. Weaver; Ralph R. Giles, both of Kingsport, Tenn.

[73] Assignee: Eastman Kodak Company, Rochester, N.Y.

[22] Filed: Feb. 27, 1969

[21] Appl. No.: 803,116

[52] U.S. Cl...........................260/308 R, 8/39, 8/40, 260/243 B, 260/247.1, 260/247.2 A, 260/247.2 B, 260/247.5 B, 260/268 PC, 260/293.62, 260/306.6 R
[51] Int. Cl.....C07d 55/06, C07d 57/00, C07d 99/10
[58] Field of Search..................................260/308 R

[56] References Cited
UNITED STATES PATENTS 3,318,903  5/1967  Peter et al. ................260/303
3,541,099  11/1970  Burdeska et al. ..........260/308

*Primary Examiner*—Alton D. Rollins
*Attorney*—J. Frederick Thomsen and Cecil D. Quillen, Jr.

[57] ABSTRACT

Anthraquinone compounds containing the group

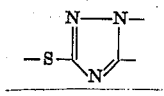

are useful as dyes for hydrophobic textile materials such as polyester, polyamide, and cellulose acetate fibers.

13 Claims, No Drawings

ANTHRAQUINONE COMPOUNDS CONTAINING A TRIAZOLYLTHIO GROUP

This application relates to certain novel anthraquinone compounds and, more particularly, to certain water-insoluble anthraquinone compounds and to hydrophobic textile materials dyed therewith.

The novel anthraquinone compounds of the invention are characterized by the presence therein of at least one triazolylthio group and conform to the formulas I. $A-[(R)_m-S-T]_n$ and IA. $A-[R-T-S-R'H]_n$ wherein A is an anthraquinone radical; R and R' each is an organic radical; T is a triazolyl radical; $m$ is 0 or 1; and $n$ is 1, 2, 3 or 4.

The compounds of the invention produce yellow to greenish-blue shades on hydrophobic textile materials such as cellulose acetate, polyamide and polyester fibers. The novel compounds, in general, exhibit improved fastness properties such as fastness to light and resistance to sublimation. Many of the novel compounds are unique in that they possess excellent sublimation fastness on polyester fibers and also produce heavy shades on cellulose acetate fibers. Many also show excellent wash fastness on cellulose acetate and polyamide textile materials. Certain of the anthraquinone compounds possess superior build-up on polyester materials when compared to other sublimation-resistant anthraquinone dyes. Another advantage of the novel anthraquinone compounds is the bifunctionality of the triazolyl radical which permits the linkage of two or more chromophoric anthraquinone groups in a single molecule. Thus, dye compounds having two or more chromophoric anthraquinone groups can be synthesized to give approximately the same hue and strength of dyeing as is produced by an equimolar mixture of dye compounds containing one of the anthraquinone groups. Such combinations of chromophoric groups in a single molecule result in a sublimation fast dye which also exhibits good affinity for and build-up on hydrophobic textile materials. The characterization of the novel anthraquinone compounds as "water-insoluble" means that the compounds are sparingly soluble in water, i.e. substantially water-insoluble, due to the absence of water solubilizing groups such as sulfo and salts thereof.

The compounds of the invention in which the mercaptotriazolyl group is attached directly to a nuclear carbon atom of the anthraquinone nucleus are represented by the formula II. $A-(ST)_n$ wherein the sulfur atom of ST is attached to a ring carbon atom of anthraquinone radical A and to a ring carbon atom of triazolyl radial T. The compounds of formula (II) can be employed in the preparation compounds having the formula

III. $A-ST'-R''-T'S-A$ wherein T' is a triazoldiyl radical, e.g. a 1,3-triazoldiyl group, and R'' is an alkylene group which is attached to the secondary nitrogen atom of each of the triazoldiyl groups. Compounds containing two anthraquinone nuclei joined by an organic group having one mercaptotriazoldiyl group are illustrated by the formula

IV. $A-ST'-R-A$ wherein R is defined above. The novel anthraquinone compounds can contain a plurality of mercaptotriazole groups joined by alkylene bridges alternatively attached to the secondary nitrogen atoms of two triazole groups and to the sulfur atoms of two triazolylthio groups. These compounds are illustrated by the formula

V. $A-ST'-R''-T'S-R''-ST$

The compounds of the invention in which the mercaptotriazolyl group is not attached directly to a nuclear carbon atom of the anthraquinone nucleus have the formulas VI. $A-(R-ST)_n$ and VIA. $A-(R-T'S-R'H)_n$ wherein organic radical R is attached to a ring carbon atom of anthraquinone radical A, and sulfur atom S is attached to a ring carbon atom of triazolyl radical T or triazoldiyl radial T'. These compounds can be used to prepare more complex compounds, analogous to those defined by formulas (III), (IV), and (V), which are illustrated by the formulas

VII. $A-R-ST'-R''-A$

VIII. $A-R-ST'-R''-ST$, and

IX. $A-R-ST'-R''-T'S-R-A$.

In formula (IA), organic radical R is attached to a ring carbon atom of anthraquinone nucleus A and to the secondary nitrogen atom of triazolyl radical T and sulfur atom S is attached to the carbon atom at the 3-position of triazolyl radical T. Certain compounds conforming to formula (IA) can be used to prepare more complex compounds such as those of formula (VII) above.

The anthraquinone radicals represented by A in the above formulas can be unsubstituted or substituted with a wide variety of substituents. Alkyl, alkoxy, substituted alkoxy, cycloalkoxy, hydroxy, halogen, aryloxy, aralkyloxy, alkylthio, cycloalkylthio, arylthio, cyano, sulfamoyl, substituted sulfamoyl, amino, substituted amino including acylamino, nitro, alkylsulfonyl, arylsulfonyl, alkoxycarbonyl, carbamoyl and substituted carbamoyl are typical substituents which can be present on the anthraquinone nucleus A.

Cyclopentoxy, cyclohexoxy, 4-methylcyclohexoxy, and cycloheptoxy are typical cycloalkoxy groups. Phenoxy and phenoxy substituted with alkyl, alkoxy, hydroxy, halogen, etc. are representative of aryloxy groups which can be present on the anthraquinone nucleus. The alkoxy, cycloalkoxy, and aryloxy groups can be combined to form a chain containing a plurality of alkylene, arylene and cycloalkylene moieties joined by ether linkages. Preferred alkoxy, cycloalkoxy and aryloxy groups have the general formula $-(-O-R^2-)_n-R^3$ wherein $R^2$ is lower alkylene, lower phenylenealkyl, lower cyclohexylenealkyl, phenylene, lower alkylphenylene, halophenylene, cyclohexylene or lower alkylcyclohexylene; $n$ is 1, 2, 3 or 4; and $R^3$ is hydrogen or hydroxy. In the above formula, when $n$ is more than 1, each $R^2$ can represent the same or different alkylene, cycloalkylene or arylene group. The following groups are typical of those conforming to the formula $-(-O-R^2-)_n-R^3$: 2-(2-hydroxyethoxy)-ethoxy, 2-butoxethoxy, 2-phenoxyethoxy, 4-methoxyphenoxy, 4-(2-hydroxyethoxy)-phenoxy, 2-[4-(2-hydroxyethoxy)phenoxy]-ethoxy, 3-[2-(4-phenoxybutoxy)ethoxy]propoxy, 4-hydroxymethyleyclophexylmethoxy, 2-methylphenoxy, 2,4-diethoxyphenoxy, benzyloxy, and 4-hydroxymethylphenylmethoxy.

Methylthio, ethylthio, propylthio, butylthio, hexylthio, phenylthio, 4-ethoxyphenylthio, 4-chlorophenylthio, cyclohexylthio, etc. are examples of the alkyl-, cycloalkyl- and aryl-thio which can be present on the anthraquinone nucleus.

The sulfamoyl and carbamoyl groups can be substituted, for example, with alkyl, substituted alkyl, cycloalkyl, or aryl or the nitrogen atom of the sulfamoyl and carbamoyl groups can be a member of a ring. Preferred sulfamoyl and carbamoyl groups have the structures

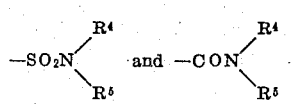

wherein $R^4$ and $R^5$ are the same or different and each is hydrogen, lower alkyl or, when taken collectively with the nitrogen atom to which they are attached, $R^4$ and $R^5$ represent the atoms necessary to complete a piperidino, lower alkylpiperidino, morpholino, lower alkylmorpholino, N-alkylpiperazino, or thiomorpholine-S,S-dioxide ring. Dimethylsulfamoyl, di(2-hydroxyethyl)sulfamoyl, phenylcarbamoyl, butylcarbamoyl, diethylcarbamoyl, cyclohexylsulfamoyl, N-ethylpiperazinosulfonyl, piperidinosulfonyl, and morpholinosulfonyl are representative substituted sulfamoyl and carbamoyl groups.

The amino groups which can be present on the anthraquinone nucleus can be unsubstituted amino or amino substituted, for example, with alkyl, substituted alkyl, cycloalkyl, aralkyl, aryl, sulfolanyl, or an acyl group. Chlorine, bromine, alkoxy, hydroxy, alkanoyloxy, cyano, etc. are typical substituents which can be present on alkyl groups. Preferably, the alkyl-, cyclo-alkyl-, aralkyl-, and aryl-amino groups which can be present on the anthraquinone nucleus conform to the formula

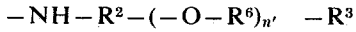

wherein $R^2$ and $R^6$ are the same or different and each is lower alkylene, lower phenylenealkyl, lower alkylphenylene-loweralkyl, lower halophenylenealkyl, lower alkoxycarbonylphenylenelower-alkyl, phenylene, lower alkylphenylene, halophenylene, cyclohexylene, or lower alkylcyclohexylene; $R^3$ is hydrogen or hydroxy; and $n'$ is 0, 1 or 2. When $n$ is 2, each of the groups represented by $R^6$ can be the same or different. Methylamino, ethylamino, propylamino, isopropylamino, butylamino, 2-hydroxyethylamino, 3-(2-hydroxyethoxy)propylamino, benzylamino, 2-phenylethylamino, 4-ethylbenzylamino, 4-chlorobenzylamino, 4-methoxycarbonylbenzylamino, anilino, 3-hydroxanilino, p-(2-[2-(3-hydroxypropoxy)ethoxy]ethyl)phenylamino, cyclohexylamino, 4-ethylcyclohexylamino, and 4-(2-hydroxy)ethoxycyclohexylamino are typical of the amino groups conforming to the formula

The acylamino groups which can be present on the anthraquinone radical have the formula -$NH-R^7$ wherein $R^7$ is formyl, alkanoyl, aroyl, cyclohexylcarbonyl, alkoxycarbonyl, aryloxycarbonyl, alkylsulfonyl, arylsulfonyl, carbamoyl, alkylcarbamoyl, arylcarbamoyl, furoyl, etc. The alkanoyl, alkylsulfonyl, and alkoxycarbonyl groups can be substituted with groups such as halogen, phenyl, cyano, alkoxy, alkylthio, alkylsulfonyl, hydroxy, etc. Acetyl, propionyl, butyryl, cyanoacetyl, chloroacetyl, phenylacetyl, methoxyacetyl, methylthioacetyl, methylsulfonylacetyl, methoxycarbonyl, propoxycarbonyl, butoxycarbonyl, methylsulfonyl, ethylsulfonyl, propylsulfonyl, butylsulfonyl, 2-cyanoethylsulfonyl, 2-methoxyethylsulfonyl, and 2-chloroethylsulfonyl, are examples of the alkanoyl, alkoxycarbonyl, and alkylsulfonyl groups which $R^7$ can represent. The aryl group of the aroyl, aryloxycarbonyl, arylsulfonyl, and alkylcarbamoyl group is preferably monocyclic, carbocyclic aryl such as unsubstituted phenyl and phenyl substituted with, for example, alkyl, alkoxy, etc. Tolyl, anisyl, p-bromophenyl, and o,p-dichlorophenyl are typical of such aryl groups. Dimethylcarbamoyl, ethylcarbamoyl, propylcarbamoyl, and butylcarbamoyl are illustrative alkylcarbamoyl groups which $R^7$ can represent.

Examples of the alkoxycarbonyl and alkylsulfonyl groups which can be present on the anthraquinone nucleus are described in the preceding description of $R^7$.

The anthraquinone nucleus also can be substituted at the α- and β-positions with a group having the formula -NH-arylene-S-, -NH-arylene-SO- or -NH-arylene-$SO_2$- in which the arylene group is an unsubstituted or substituted o-phenylene radical.

The organic radicals represented by R and R' can be alkylene, cyclohexylene, arylene or a combination of such groups which also can contain one or more oxygen, sulfur or nitrogen atoms in the main chain. Ethylene, propylene, isopropylene, 2-hydroxypropylene, butylene, ethyleneoxyethyl, propylenethiopropyl, hexylene, aminobutylene, aminopropyleneoxypropylamino, phenyleneoxymethyl, phenyleneoxyethoxy, methylenecyclohexylmethoxy, propylenesulfamoyl, methylenephenylsulfonamido, etc. are typical of the organic groups which R can represent. Many patents exist which describe anthraquinone compounds containing groups which can function as bridging groups between the anthraquinone nucleus A and the mercaptotriazolyl group -ST. See, for example, U.S. Pat. Nos. 2,253,082; 2,307,782; 2,319,043; 2,338,908; 2,357,176; 2,391,011; 2,411,148; 2,459,149; 2,487,045; 2,641,602; 2,651,641; 2,659,740; 2,726,251; 2,763,668; 2,777,863; 2,895,967; 2,968,661; 2,992,240; 3,072,683; 3,153,059; 3,254,078; 3,324,150; 3,379,738; 3,391,164; and French Pat. No. 1,446,845. These patents disclose compounds containing a hydroxy group which can be halogenated followed by reaction with a mercaptotriazole to yield the corresponding triazolylthio compound. The divalent analogs of many of the groups which can be present on anthraquinone nucleus A also can function as bridging groups.

Preferably R represents a group having the formula -(-O-$R^2$)$_{n'}$-($R^7$)$_{m'}$-, or -NH-$R^2$-(-O-$R^6$)$_{n'}$-($R^7$)$_{m}$- wherein $R^2$, $R^6$ and n are defined above, $R^7$ is lower alkylene, n' is 0, 1 or 2, and m' is 0 or, when the terminal group represented by $R^6$, i.e. the group adjacent to $R^{7.}$ is aryl, 1. The organic radical represented by R' preferably is cycloalkyl or an unsubstituted or substituted alkyl radical such as are represented by $R^8$.

The triazolyl radicals represented by T can be unsubstituted or substituted, for example, with alkyl, substituted alkyl, cyclohexyl, aryl, aralkyl, or acyl groups. Examples of the alkyl, aryl and aralkyl groups which can be present on the triazolyl groups are described hereinabove. The alkyl groups can be substituted with cyano, hydroxy, alkanoyloxy, alkoxy, aryl, aryloxy, alkylthio, phenylthio, alkanoylamino, di(alkanoylamino), dicarboximido, alkylsulfonamido, arylsulfonamido, di(alkylsulfonamido), alkanoyl, alkylsulfonyl, aroyl, aroylamino, carbamoyl, substituted carbamoyl, sulfamoyl, substituted sulfamoyl, alkoxycarbonyl, etc. Examples of the substituted alkyl groups include 2-cyanoethyl, 2-hydroxyethyl, 2,3-dihydroxypropyl, 2-acetoxyethyl, 3-propionoxypropyl, 2-ethoxyethyl, 3-methoxypropyl, benzyl, 2-phenylethyl, p-methoxybenzyl, 3-phenoxypropyl, 2-methylthioethyl, 3-phenylthiopropyl, 3-acetamidopropyl, 2-(N-acetyl)acetamidoethyl, 4-succinimidobutyl, 3-phthalimidopropyl, 2-glutarimidoethyl, 2-methylsulfonamidoethyl, 3-butylsulfonamidopropyl, 3-(N-methylsulfonyl)methylsulfonamidopropyl, 4-propionylbutyl, 3-methylsulfonylpropyl, 2-vinylsulfonylethyl, 2-benzoylethyl, 3-p-toloylpropyl, 2-p-chlorobenzoylethyl, 2-carbamoylethyl, 2-ethylcarbamoylethyl, 3-(dimethyl)carbamoylpropyl, 2-sulfamoylethyl, 2-butylsulfamoylethyl, 3-ethoxycarbonylpropyl, etc.

The groups recited hereinabove which contain an alkyl moiety, e.g. alkyl, alkoxy, alkylsulfonyl, etc., can contain from one to eight or more carbon atoms. However, the alkyl moiety of these groups is preferably lower alkyl, meaning a carbon content of from one to about four carbon atoms.

The triazolyl radicals represented by T can be substituted with a wide variety of substituents such as those described hereinabove. Preferred triazolylthio radicals conform to the formula

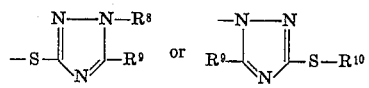

wherein $R^8$ is hydrogen; lower alkyl; lower alkyl substituted with cyano, hydroxy, halogen, lower alkoxy, carbamoyl, lower alkanoyloxy, lower alkoxycarbonyl, lower dialkylamino, succinimido, glutarimido, phthalimido, phenyl, lower alkylphenyl, lower alkoxyphenyl, halophenyl, or lower alkoxycarbonylphenyl; cyclohexyl; lower alkylcyclohexyl; lower alkanoyl; or lower alkylsulfonyl; $R^9$ is hydrogen, lower alkyl, phenyl, or phenyl substituted with lower alkyl, lower alkoxy, or halogen; and $R^{10}$ is cycloalkyl or an unsubstituted or substituted alkyl group represented by $R^8$. The nitrogen atom to which $R^8$ is attached is referred to herein as the secondary nitrogen atom.

The triazolyl radical T can exist as the 1H, 2H or 4H form, e.g.

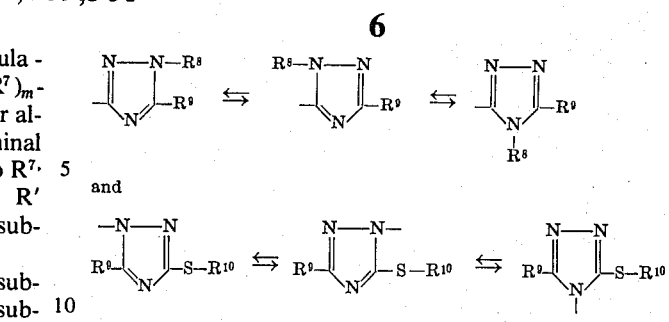

and

Although the triazolyl groups are described herein and in the claims, both generically and structurally, as the 1H form, the 2H and 4H forms are within the scope of the invention. When $R^8$ is other than hydrogen, T represents 1, 2 or 3 isomeric, but different, groups and thus an anthraquinone compound of the invention which contains an N-substituted triazolyl group actually can be a mixture of 2 or 3 compounds. It is to be understood that the descriptions of such anthraquinone compounds appearing herein is inclusive of the 3 isomeric forms thereof.

The preferred anthraquinone compounds of the invention conform to formulas X–XV:

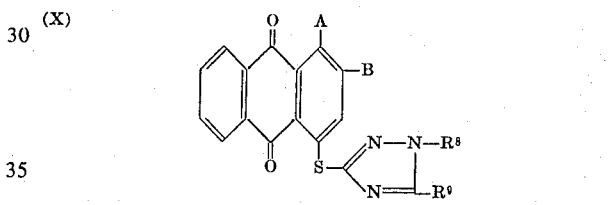

(X)

wherein

A is hydroxy, lower alkoxy, amino, lower alkylamino, -NHAr, lower alkylsulfonamido, -NHSO$_2$Ar, cyclohexylsulfonamido, lower alkanoylamino, -NHCOAr, or lower alkoxycarbonylamino;

B is halogen, lower alkyl, a group having the formula -(-O-$R^2$)$_n$-$R^3$, lower alkylthio, -SAr, cyano, lower alkylsulfonyl, -SO$_2$Ar, lower alkoxycarbonyl, a group having the formula -SO$_2$NR$^4$R$^5$ or -CONR$^4$R$^5$, or a group having the formula

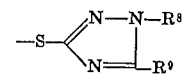

wherein $R^2$, $R^3$, $R^4$, $R^5$, $R^8$ and $R^9$ are defined hereinabove and wherein Ar is phenyl or phenyl substituted with lower alkyl, lower alkoxy or halogen.

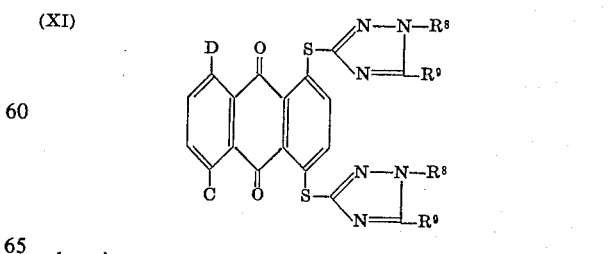

(XI)

wherein

C and D are the same or different and each is hydrogen, A, or the group

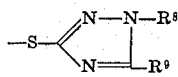

and $R^8$, $R^9$ and A are defined above.

(XII) 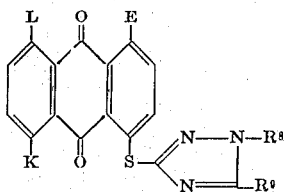

wherein
E is hydrogen, halogen, nitro or A;
L and K each is nitro or C, except that only one of L and K can represent the group

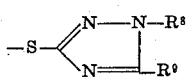

wherein
$R^8$, $R^9$, A and C are defined above.

(XIII) 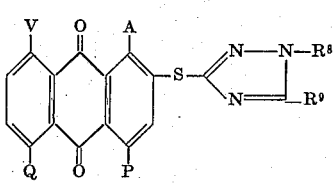

wherein
P is hydrogen, A, lower alkylthio or -SAr;
Q and V are the same or different and each is hydrogen or A; and
$R^8$, $R^9$, C and Ar are defined above.

(XIV) 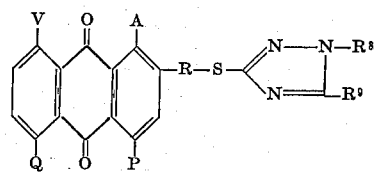

and (XIVA) 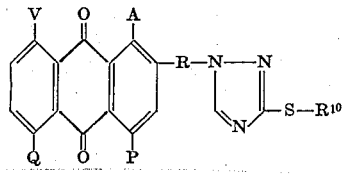

wherein R is lower alkylenethio or a group having the formula $-(-O-R^2)_n -(R^7)_m -$, or, when A and P each is hydroxy, R can represent a group having the formula $-NH-R^2-(-O-R^6)_n -(R^7)_m 10 -$, and $R^2$, $R^6$, $R^7$, $R^8$, $R^9$, $R^{10}$, A, P, Q, V, $n'$ and $m'$ are defined above.

(XV) 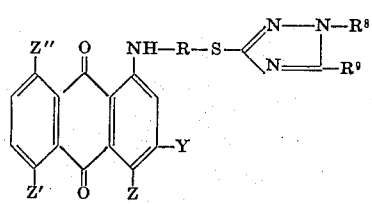

and (XVA) 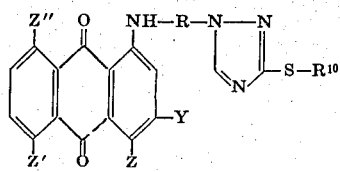

wherein
Y is hydrogen, lower alkyl, lower alkylthio, phenylthio, halogen, cyano or a group having the formula $-(-O-R^2)_n-R^3$;
Z is hydrogen, A, or, when Y is hydrogen, Z can represent a group having the formula

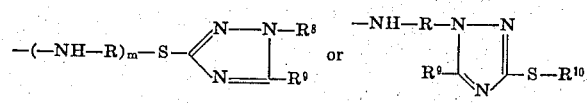

Z' and Z'' are the same or different and each is hydrogen, A, halogen, nitro, or, when Y is hydrogen, one or both of Z' and Z'' can represent a group having the formula

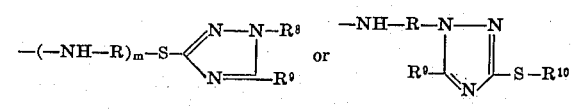

except that when Z'' is nitro, Z' is hydroxy;
R is a group having the formula $-R^2-(-O-R^6)_n -(R^7)_m -$; and
$R^2$, $R^3$, $R^6$, $R^7$, $R^8$, $R^9$, A, n, n' and m' are defined above.

When the compounds of formulas (X) through (XVA) contain more than one triazolyl group, the substituents $R^8$ and $R^9$ can be the same or different, i.e. the triazolyl radicals can be the same or different. For economical reasons the triazolyl radicals preferably are the same.

The compounds of formulas (XVI) through (XXI), are especially valuable dyes for polyester, polyamide and/or cellulose acetate fibers, yarns and fabrics. These anthraquinone compounds exhibit excellent dyeability and fastness properties and also possess economic advantages.

(XVI) 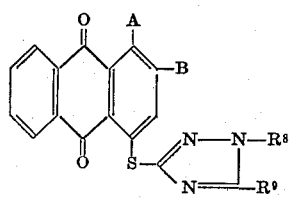

wherein
A is hydroxy, amino, lower alkylamino, anilino, lower alkylsulfonamido, phenylsulfonamido, or tolylsulfonamido;
B is halogen, cyano, lower alkoxy, lower hydroxyalkoxy, lower alkoxy-lower-alkoxy, lower hydroxyalkoxy-lower alkoxy, lower alkylthio, sulfamoyl, lower alkylsulfamoyl, di-lower alkylsulfamoyl, morpholinosulfonyl, piperidinosulfonyl, thiomorpholino-S,S-dioxidesulfonyl, or the group

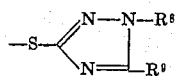

$R^8$ is hydrogen, lower alkyl, cyanoethyl, benzyl, or cyclohexyl; and $R^9$ is hydrogen, lower alkyl or phenyl.

(XVII)

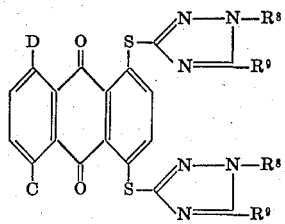

wherein

C and D are the same or different and each is hydrogen, hydroxy, amino, lower alkylamino, anilino, lower alkylsulfonamido, phenylsulfonamido, or tolylsulfonamido;

$R^8$ is hydrogen, lower alkyl, cyanoethyl, benzyl, or cyclohexyl; and $R^9$ is hydrogen, lower alkyl or phenyl.

(XVIII)

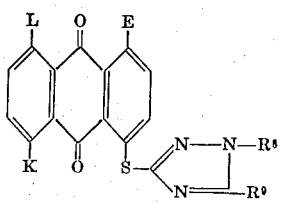

wherein

E is hydrogen, hydroxy, amino, lower alkylamino, anilino, lower alkylsulfonamido, phenylsulfonamido, or tolylsulfonamido;

L and K are the same or different and each is hydrogen, hydroxy, amino, lower alkylamino, anilino, lower alkylsulfonamido, phenylsulfonamido, tolylsulfonamido, or a triazolyl group having the formula

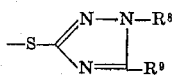

except that only one of L and K can represent a triazolyl group.

$R^8$ is hydrogen, lower alkyl, cyanoethyl, benzyl, or cyclohexyl; and $R^9$ is hydrogen, lower alkyl or phenyl.

(XIX)

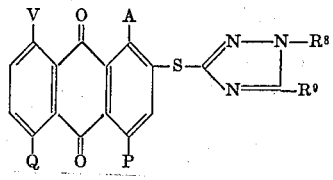

wherein

A is hydroxy or amino;

P is hydrogen, hydroxy, amino, lower alkylamino, anilino, lower alkylsulfonamido, phenylsulfonamido, or tolylsulfonamido;

Q and V are the same or different and each is hydrogen, hydroxy, or amino;

$R^8$ is hydrogen, lower alkyl, cyanoethyl, benzyl, or cyclohexyl; and $R^9$ is hydrogen, lower alkyl, or phenyl.

(XX)

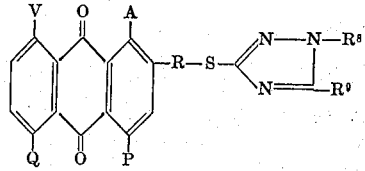

wherein

R is lower alkyleneoxy, lower alkyleneoxy-lower-alkoxy, alkyleneoxyphenoxy, alkylenephenoxy, or, when A and P each is hydroxy, R can represent lower alkyleneamino, lower alkyleneoxy-lower-alkylamino, lower alkyleneanilino, or lower alkyleneoxyanilino;

A is hydroxy or amino;

P is hydrogen, hydroxy, amino, lower alkylamino, anilino, lower alkylsulfonamido, phenylsulfonamido; or tolylsulfonamido;

Q and V are the same or different and each is hydrogen, hydroxy, or amino;

$R^8$ is hydrogen, lower alkyl, cyanoethyl, benzyl, or cyclohexyl; and $R^9$ is hydrogen, lower alkyl or phenyl.

(XXI)

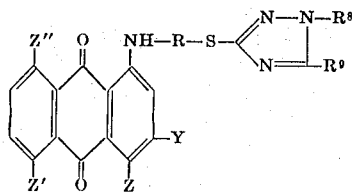

wherein

R is lower alkylene, lower alkyleneoxy-lower-alkyl, lower alkylenephenyl, or lower alkyleneoxyphenyl;

Y is hydrogen, lower alkoxy, or cyano;

Z is hydrogen, hydroxy, amino, lower alkylamino, anilino, lower alkylsulfonamido, phenylsulfonamido, tolylsulfonamido, or, when Y is hydrogen, Z can represent the group

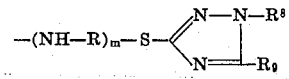

wherein $m$ is 0 or 1;

Z' and Z" are the same or different and each is hydrogen, halogen, nitro, hydroxy, amino, lower alkylamino, anilino, lower alkylsulfonamido, phenylsulfonamido, tolylsulfonamido, or, when Y is hydrogen, one or both of Z' and Z" can represent the group

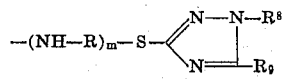

except that when Z" is nitro, Z' is hydroxy.

The anthraquinone compounds of the invention are prepared according to known procedures. For example, a haloanthraquinone can be reacted with a mercaptotriazole to synthesize compounds having the formula A-(ST)$_n$ of a 1-hydroxy-4-nitroanthraquinone can be reacted with a mercaptotriazole in the presence of pyridine to obtain the corresponding 2-substituted compound. The novel compounds having the formula A-(R-ST)$_n$ can be obtained by reacting a compound having the formula A-(R-halogen)$_n$ with a mercaptotriazole. The compounds of formula A-(R-T-S-RH) are prepared by the methods analogous to those used for the preparation of compounds of formula (VI), using a triazole of the formula T-SRH which is unsubstituted at the 1-position. The mercaptotriazoles employed in the preparation of the novel anthraquinone compounds are known compounds and/or can be prepared according to published procedures. The anthraquinone compounds having a mercaptotriazole group substituted at the 1-position can be prepared by reacting the compound with (1) an acylating agent such as an alkylsulfonyl halide, an arylsulfonyl halide, an alkanoic anhydride or acid halide, or an aroyl halide, (2) an alkylating agent such as a di-alkylsulfate, an alkyl arylsulfonate, a trialkyl phosphate, aryl halide, an aralkyl halide or an alkyl halide, (3) an activated vinyl compound such as acrylonitrile, or (4) an epoxide such as ethylene oxide, propylene oxide, epichlorohydrin, and styrene oxide. Methanesulfonyl chloride, p-tolylsulfonyl chloride, acetic anhydride, propionic anhydride, acetyl chloride, benzoyl chloride, dimethyl sulfate, diethyl sulfate, ethyl p-toluenesulfonate, triethyl phosphate, bromobenzene, benzyl chloride, ethyl bromide, 1,2-dibromoethane, and 1-bromo-3-chloropropane are examples of the acylating and alkylating agents useful in preparing the 1-substituted mercaptotriazoles.

The preparation and use of the novel anthraquinone compounds is further illustrated in the following examples.

EXAMPLE 1

1-Chloroanthraquinone (4.84 g.), 3-mercapto-1H-1,2,4-triazole (2.20 g.), and potassium carbonate (2.80 g.) are heated in 50 ml. of N,N-dimethylformamide (DMF) at 120°–125° C. for 1 hour. The reaction mixture is then drowned in water, acidified with acetic acid, and filtered. The precipitate is dried in air to a weight of 6.2 g., then dissolved in 50 ml. of boiling 2-methoxyethanol and filtered hot. A product is filtered from the cooled solution, washed with methanol and dried to a constant weight of 3.0 g.; melting point — 260°–263° C. The product, 1-(1H-1,2,4-triazol-3-ylthio)anthraquinone, dyes cellulose acetate and polyester fibers yellow with a slightly greenish hue.

Anal. Calcd.: C-62.6%, H-3.00%, N-13.70%
Found: C-62.63%, H-3.05%, N-13.33%

EXAMPLE 2

Sodium nitrate (9.18 g.) is added in portions of a 1 hour period to 30.18 g. of 1-(1H-1,2,4-triazol-3-ylthioanthraquinone in 200 ml. of concentrated sulfuric acid at 0°–2° C. the temperature is allowed to rise to 10° C. during the second hour and then the product is recovered by drowning the reaction mixture in an ice-water mixture, filtering and washing the precipitate free of acid. A yield of 33.24 g. of 1-nitro-4-(1H-1,2,4-triazol-3-ylthio)anthraquinone, which gives yellow dyeings on polyester fibers, is obtained.

EXAMPLE 3

1-Amino-4-chloroanthraquinone (19.2 g.), 3-mercapto-1H-1,2,4-triazole (9.5 g.) and potassium carbonate (12.0 g.) in 200 ml of DMF are heated at 110°–115° C. for 1½ hours. The reaction mixture is then diluted with 2 liters of water and filtered hot. Upon cooling and acidification of the filtrate, the product crystallizes. The product is filtered off and dried to give 18.75 g. of 1-amino-4-(1H-1,2,4-triazol-3-ylthioanthraquinone which produces bright pink shades on polyester, polyamide and cellulose acetate fiber and exhibits high tinctorial power and excellent resistance to sublimation. The melting point is 234°–235° C. after recrystallization from nitrobenzene followed by washing with benzene.

Anal. Calcd.: C-59.60%, H-3.1%, N-17.40%, S-9.9%
Found: C-59.48%, H-3.37%, N-17.37%, S-9.7%

The dye compound prepared in this example can also be obtained by reducing the nitro group of the dye product obtained in Example 2 to the amino group. The reduction can be carried out by heating a mixture of the nitro compound, potassium carbonate, phenyl hydrazine and ethanol at 75°–78° C. for 25 minutes. The dye compound can also be synthesized by reacting bromamine acid with 3-mercapto-1-H-1,2,4-triazole followed by desulfonation of the intermediate.

EXAMPLE 4

The procedure described in Example 3 was repeated using 3-mercapto-5-methyl-1H-1,2,4-triazole in place of the triazole employed in the preceding example. The product obtained, 1-amino-4-(5-methyl-1H-1,2,4-triazolylthio)anthraquinone, possesses properties similar to the anthraquinone product of Example 3.

EXAMPLE 5

3-Mercapto-5-phenyl-1H-1,2,4-triazole (2.36 g.) is reacted with 1-amino-4-bromoanthraquinone (3.00 g.) and potassium carbonate (2.70 g.) in dimethylformamide (25 ml.) at 120°–123° C. for ¾ hour, then drowned in water and filtered hot. Addition of acetic acid precipitates 1-amino-4-[(5-phenyl-1H-1,2,4-triazol-3-yl)thio]anthraquinone (3.55 g.). The product produces deep pink shades having excellent fastness properties on polyester fibers.

EXAMPLE 6

1-Amino-4-[(1H-1,2,4-triazol-3-yl)thio]anthraquinone (4.57 g.) is heated in 150 ml. of glacial acetic acid, then cooled to about 30° C. to form a thin paste. A concentrated solution of 2.30 g. of bromine in acetic acid is added. The temperature is raised to 65° C., and about 50 percent reaction occurs in 1 hour. When 2.00 g. more bromine and 25 ml. of sulfuric acid are added, reaction is found to be almost complete after another ½ hour at 75° C., and complete in another 15 minutes after adding a few more drops of bromine. The material is diluted to 500 ml. with ice and water, and 2.5 g. of sodium bisulfite is added. The precipitate, filtered off, washed acid-free with water, and dried at 60° C., weighs 4.52 g. The product, 1-amino-2-bromo-4-(1H-1,2,4-triazol-3-yl)thioanthraquinone, dyes cellulose acetate and polyester fibers pink and exhibits excellent light and sublimation fastness. Sulfur analysis: Calculated — 8.03%, found — 8.04%.

EXAMPLE 7

30.3 g. of 78.5 percent bromamine acid (1-amino-4-bromoanthraquinone-2-sulfonic acid) in 250 ml. of dimethylformamide is reacted with 7.6 g. of 3-mercapto-1H-1,2,4-triazole, along with 10.4 g. of potassium carbonate, at 95°–110° C. for 1 hour. The material, diluted with 1,000 ml. of water, is treated with 150 g. of sodium chloride, then acidified with acetic acid, cooled, and filtered. The precipitate is washed with 15 percent sodium chloride solution. A yield of 32.9 g. of 1-amino-4-(1H-1,2,4-triazol-3-yl)thioanthraquinone-2-sulfonic acid, including some sodium chloride, is obtained. 1-Amino-4-(1H-1,2,4-triazol-3-yl)thioanthraquinone-2-sulfonic acid (4.23 g.) in 80 ml. of methanol and 20 ml. of 50 percent aqueous sodium hydroxide solution are refluxed for 4 hours. The red sodium salt is filtered out, slurried in 200 ml. of water, and acidified with acetic acid. A yield of 3.00 g. of 1-amino-2-methoxy-4-(1H-1,2,4-triazol-3-yl)thioanthraquinone is obtained. It dyes cellulose acetate and polyester fibers an orange shade with very good lightfastness.

EXAMPLE 8

1-Amino-2-piperidinosulfonyl-4-bromoanthraquinone (2.25 g.), 3-mercapto-1H-1,2,4-triazole (1.00 g.) and potassium carbonate (1.00 g.) in 40 ml. of DMF are heated on a steam bath for ½ hour, then drowned in water and acidified. The resulting precipitate weights 2.0 g. and, when recrystallized from chlorobenzene, the product, 1-amino-2-piperidinosulfonyl-4-(1H-1,2,4-triazol-3-yl)thioanthraquinone, has a melting point of 211°–214° C. It produces a bluish pink shade on polyester fibers and exhibits excellent fastness to light and sublimation.

Anal.: Calcd.: C-53.70%, H-4.10%, N-14.90%
Found: C-53.43%, H-4.38%, N-14.27%

EXAMPLE 9

1-Amino-2-bromo-4-hydroxyanthraquinone (2.0 g.), 3-mercapto-1H-1,2,4-triazole (1.0 g.), potassium carbonate (1.0 g.) and 20 ml. of DMF are heated for ¾ of an hour at about 85° C. A yield of 1.96 g. of 1-amino-2-(1H-1,2,4-triazol-3-ylthio)-4-hydroxyanthraquinone is obtained. The product melts at 243°–245° C. when recrystallized from nitrobenzene. The product dyes cellulose acetate and polyester a reddish-violet shade and has excellent light and sublimation fastness.

Anal.: Calcd.: C-56.70%, H-3.00%, N-16.50%, S-9.50%
Found: C-56.88%, H-2.98%, N-16.77%, S-9.11%

EXAMPLE 10

1-Amino-2,4-dibromoanthraquinone (0.01 mol), 3-mercapto-1H-1,2,4-triazole (0.024 mol) and sodium carbonate (0.22 mol) in 50 ml. of DMF are heated on a steam bath for 1 hour. The product, 1-amino-2,4-bis(1H-1,2,4-triazol-3-ylthio)anthraquinone, is isolated in the manner described in Example 3. The product dye cellulose acetate and polyester fibers a deep pink.

EXAMPLE 11

Dinitrochrysazin (3.30 g.) is heated, with stirring, in pyridine (50 ml.), then cooled below room temperature and treated with 3-mercapto-1H-1,2,4-triazole in 10 percent excess (1.11 g.). The product is separated from the dinitrochrysazin by drowning the material in water and adding sufficient potassium carbonate to dissolve the product as it was warmed. Acidification of the filtrate precipitated 0.99 g. of 1,8-dihydroxy-4,5-dinitro-2-(1H-1,2,4-triazol-3ylthio)anthraquinone.

Reduction of the triazolylthiodinitrochrysazin with sodium sulfide solution produces 1,8-diamino-4,5-dihydroxy-3-(1H-1,2,4-triazol-3-yl)thioanthraquinone, which dyes cellulose acetate and polyester fabrics a bright, deep blue.

EXAMPLE 12

1-Amino-4-[(1H-1,2,4-triazol-3-yl)thio]anthraquinone (0.5 g.) is dispersed in acetone and treated with 2 drops of acetic anhydride. The material becomes completely soluble immediately, and about 50 percent reaction is indicated by chromatography. Addition of 3 more drops of acetic anhydride and raising the temperature to 30° C. causes completion of the reaction. The product, 1-amino-4-(1-acetyl-1H-1,2,4-triazol-3-yl)thioanthraquinone, weighs 0.39 g. Fabrics dyed with the product appeared the same in all measured properties as those obtained from the product of Example 3.

EXAMPLE 13

1.0 g. of 1-amino-2-methoxy-4-[(1H-1,2,4-triazol-3-yl)thio]anthraquinone (Example 8) and 0.1 g. of hydroquinone in 20 ml. of 1,4-dioxane are treated with 3 ml. of acrylonitrile and 5 drops of a 40 percent solution of Triton B (benzyltriethylammonium hydroxide) in methanol, and heated on a steam bath for 1 hour, the drowned in water made alkaline with sodium hydroxide. On filtering, 1.0 g. of 1-amino-2-methoxy-4-(1β-cyanoethyl-1H-1,2,4-triazol-2-yl)thioanthraquinone is obtained, which dyes both cellulose acetate and polyester fibers an orange-red color, of greater strength than the unalkylated material, and which does not fade during the 20-hour light test, and which does not sublime from the polyester during 1 minute at 350° F.

EXAMPLE 14

A solution of 0.71 g. of 1-amino-2-bromo-4-(1H-1,2,4-triazol-3-yl)thioanthraquinone in 2-methoxyethanol is diluted with 2–3 volumes of water, then kept slightly alkaline with potassium carbonate as 1.5 ml. of diethyl sulfate is added over a period of about 1 hour at 40°–45° C. After another hour, during which time considerable precipitation has occurred, the material is diluted further with water, and the precipitate is filtered out to yield 0.6 g. of 1-amino-2-bromo-4-(1-ethyl-1H-1,2,4-triazol-3-ylthio)anthraquinone which produces bright pink shades on polyester fibers.

EXAMPLE 15

1-Amino-4-(1H-1,2,4-triazol-3-ylthio)anthraquinone (3.2 g.), 1-bromo-3-chloropropane (1.5 g.), potassium carbonate (3.5 g.) in 50 ml. of DMF are heated at 40° C. for about 2 hours. The product, recovered by drowning in water, is then purified by extracting with hot toluene and diluting the solution with hexane, weighs 2.97 g. The product, 1-amino-4-(1-[3-chloropropyl]-1H-1,2,4-triazol-3-ylthio)anthraquinone gives fast pink dyeings on cellulose acetate and polyester fibers. 1,5-Bis(1H-1,2,4-triazol-3-ylthio)anthraquinone (8.12 g.) is treated with 1-bromo-3-chloropropane (6.30 g.) to obtain 1,5-bis(1-[3-chloropropyl]-1H-1,2,4-triazol-3-ylthio)anthraquinone (6.5 g.) which produces yellow shades on cellulose acetate and polyester fibers.

EXAMPLE 16

1-Amino-4-(1H-1,2,4-triazol-3-ylthio)anthraquinone (1.30 g.), 1,2-dibromoethane (0.35 g.) and potassium carbonate (1.20 g.) in DMF (15 ml.) are heated just below 100° C. to prepare the compound 1,2,-bis[3-(1-amino-4-anthraquinonylthio)1H-1,2,4-triazol-1-yl]ethane which has the structure:

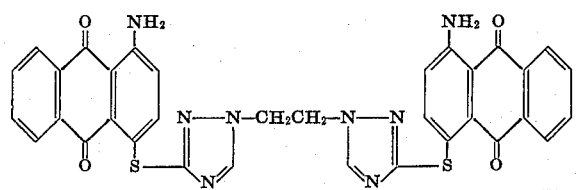

This compound produces pink shades on cellulose acetate and polyester fibers.

EXAMPLE 17

Equimolar amounts of 1,5-bis(1H-1,2,4-triazol-3-ylthio)-anthraquinone and 1-amino-4-[1-(3-chloropropylpropyl)-1H-1,2,4-triazol-3-ylthio]anthraquinone are reacted in the presence of potassium carbonate and DMF according to the procedure described in Example 16. The secondary nitrogen atom of the bis-anthraquinone compound thus obtained is alkylated by treating 0.70 g. of the bis-anthraquinone compound, in a solution of 40 ml. water, 20 ml. ethanol and 1.0 g. of potassium carbonate, with 1 ml. of diethyl sulfate at 25°–35° C. for 1 hour. A yield of 0.70 g. of 1-[3-(1-amino-4-anthraquinonylthio)1H-1,2,4-triazol-1-yl]-3-[3-(1-[-1-ethyl-1H-1,2,4-triazol-3-ylthio]anthraquinonylthio)-1H-1,2,4-triazol-1-yl]propane having the structure:

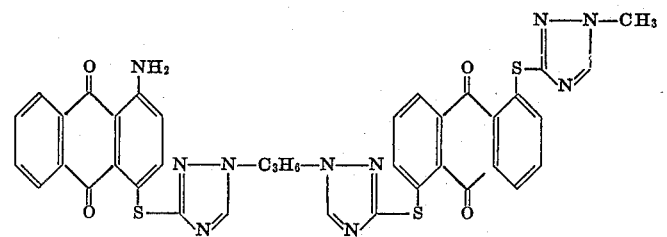

This compound exhibits excellent properties when applied to polyester and cellulose acetate fibers which the compound dyes orange.

EXAMPLE 18

Two parts by weight of 3-mercapto-1H-1,2,4-triazole is reacted with 1 part 1,2-dibromoethane in the presence of ethanol and potassium carbonate. After stirring overnight at about 27°–28° C., the material is diluted and acidified to recover the product, 1,2-bis(1H-1,2,4-triazol-3-ylthio)ethane, as a precipitate.

Anal.: Calcd.: C-31.56%, H-3.54%, S-28.09%
Found: C-31.22%, H-3.64%, S-28.37%

When equimolar amounts of the compound prepared hereinabove is reacted with 1-amino-4-[1-(3-chloropropyl)-1H-1,2,4-triazol-3-ylthio]anthraquinone followed by alkylation with dimethylsulfate the compound having the structure

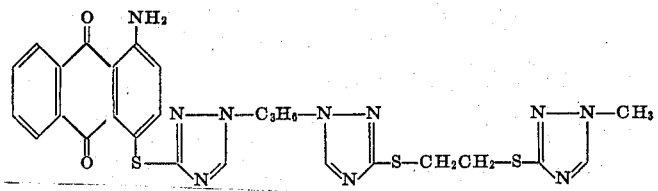

is obtained. This compound imparts fast pink shades to polyester and cellulose acetate fibers.

EXAMPLE 19

1-Amino-2-[2-(2-chloroethoxy)ethoxy]-4-hydroxyanthra-quinone (1.00 g.) is added to a solution of 3-mercapto-1H-1,2,4-triazole (1.00 g.) and potassium carbonate in DMF (50 ml.). After 20 minutes the material is drowned in dilute sodium chloride solution and filtered out. A yield of 1-amino-2-[2-(2-[1H-1,2,4-triazol-3-ylthio]ethoxy)ethoxy]-4-hydroxyanthraquinone is obtained. This compound produces fast pink shades on cellulose acetate, polyester and polyamide fibers.

EXAMPLE 20

1.38 g. of 1-amino-2-(α-chloro-p-tolyloxy)-4-hydroxyanthraquinone, 0.45 g. of potassium acetate in 20 ml. of methoxyethanol are heated at 64°–65° C. for 15–20 minutes, then diluted with 50 percent aqueous methanol. After neutralizing with acetic acid and filtering, then recrystallizing from boiling acetic acid, a yield of 1.03 g. of 1-amino-4-hydroxy-2-[4-(1H-1,2,4-triazol-3-ylthiomethyl)phenoxy]anthraquinone is obtained. It produces a strong pink color on polyester fibers.

EXAMPLE 21

3-Mercapto-1H-1,2,4-triazole (0.81 g.) in 30 ml. DMF is treated with ethyl iodide (1.37 g.) and potassium carbonate (1.21 g.) at an initial temperature of 35° C. The temperature is raised to about 100° C. during the next 30 minutes. 1-Amino-2-[2-(2-chloroethoxy)ethoxy]-4-p-tolylsulfonamidoanthraquinone (2.00 g.) is then added. After 4 hours at about 100° C., the product is recovered by drowning in water and recrystallizing from acetic acid. A yield of 1.68 g. of 1-amino-2-[2-(2-[3-ethylthio-1H-1,2,4-triazol-1-yl]ethoxy)ethoxy]e-4-p-tolylsulfonamidoanthraquinone is obtained. The product produces fast pink shades on cellulose acetate and polyester fibers and has the structure:

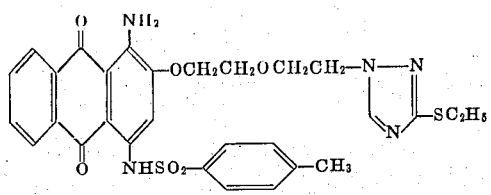

EXAMPLE 22

A solution of 0.50 g. of 1-amino-2-(4-chlorobutoxy)-4-hydroxyanthraquinone, 0.35 g. of 1,2-bis(1H-1,2,4-triazol-3-ylthio)ethane, and 0.50 g. of potassium carbonate in 15 ml. of DMF is heated at 95°–97° C. for ½ hour, then 1 ml. of diethyl sulfate and 0.75 g. potassium carbonate are added to the solution at 50°–64° C. over a period of about an hour. The product was obtained by drowning the reaction mixture in water and filtering. After purification, 0.16 g. of product was obtained. The product produces strong pink shades on cellulose acetate and polyester fibers and has the formula:

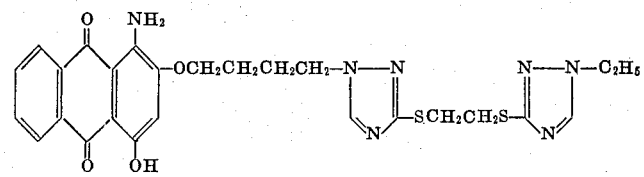

The novel anthraquinone compounds set forth in the examples of Table I are prepared by procedures analogous to those described and conform to the general formula $$A-S T$$

wherein A is the anthraquinone nucleus and T is a triazolylthio radical, attached to a ring carbon atom of the anthraquinone nucleus A, having the structure:

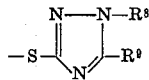

The color given for each compound in Tables I and II is the shade produced by the compound on polyester fibers.

TABLE I

| ex. no. | Substituents on Anthraquinone Nucleus A | Position of -ST on Anthraquinone Nucleus A | R⁸ | R⁹ | Color |
|---|---|---|---|---|---|
| 23 | 1-NH₂ | 2 | H | H | orange-yellow |
| 24 | 1-NH₂ | 2 | -C₂H₅ | H | orange-yellow |
| 25 | 1-NH₂-4-OH | 2 | -CH₃ | H | violet |
| 26 | 1,4-di-NH₂ | 2 | H | H | blue-violet |
| 27 | 1-NH₂-4-NHC₆H₅ | 2 | -C₂H₅ | H | blue |
| 28 | 1-NH₂-4-NH-C₆H₄-m-CH₂OH | 2 | H | H | blue |
| 29 | 1-NH₂-4-NHCOC₅H₁₁ | 2 | H | H | red-violet |
| 30 | 1-NH₂-4-NHCOC₅H₁₁ | 2 | -C₂H₅ | H | red violet |
| 31 | 1-NH₂-4-NHC₆H₄-p-OC₂H₄OH | 2 | H | H | blue |
| 32 | 1-NH₂-4-NHC₆H₄-p-OC₂H₄OH | 2 | -C₂H₅ | H | blue |
| 33 | 1-NH₂-4-NHSO₂CH₃ | 2 | -CH₂CH₂CN | H | bluish-red |
| 34 | 1-NH₂-4-NHSO₂C₆H₄-p-cH₃ | 2 | -C₂H₅ | H | bluish-red |
| 35 | 1,4-di-OH | 2 | H | H | red-brown |
| 36 | 1,4-di-OH | 2 | -C₃H₇ | H | red-brown |
| 37 | 1-NHC₆H₄-p-C₂H₄OH-4,5-di-OH-8-NO₂ | 3 | H | H | blue |
| 38 | 1-NH₂ | 4 | -CH₃ | H | pink |
| 39 | 1-NH₂ | 4 | -C₂H₅ | H | pink |
| 40 | 1-NH₂ | 4 | -C₂H₅ | -CH₃ | pink |
| 41 | 1-NH₂ | 4 | -C₂H₅ | -C₆H₅ | pink |
| 42 | 1-NH₂ | 4 | -(CH₂)₁₅CH₃ | H | pink |
| 43 | 1-NH₂ | 4 | -CH₂C₆H₅ | H | pink |
| 44 | 1-NH₂ | 4 | -CH₂CH₂C₆H₅ | H | pink |
| 45 | 1-NH₂ | 4 | -C₆H₁₁ | H | pink |
| 46 | 1-NH₂ | 4 | -C₆H₅ | H | pink |
| 47 | 1-NH₂ | 4 | -CH₂CN | H | pink |
| 48 | 1-NH₂ | 4 | -C₂H₄CN | -CH₃ | pink |
| 49 | 1-NH₂ | 4 | -C₂H₄CN | -C₆H₅ | pink |
| 50 | 1-NH₂ | 4 | -C₂H₄OH | H | pink |
| 51 | 1-NH₂ | 4 | -CH₂CHOHCH₂OH | H | pink |
| 52 | 1-NH₂ | 4 | -C₂H₄OC₂H₅ | H | pink |
| 53 | 1-NH₂ | 4 | -(CH₂)₃-S-C₆H₄-p-C(CH₃)₃ | H | pink |
| 54 | 1-NH₂ | 4 | -CH₂COOCH₃ | H | pink |
| 55 | 1-NH₂ | 4 | -CH₂CONH₂ | H | pink |
| 56 | 1-NH₂ | 4 | -CH₂COC₂H₅ | H | pink |
| 57 | 1-NH₂ | 4 | -C₂H₄N(CH₃)₂ | H | pink |
| 58 | 1-NH₂ | 4 | -C₂H₄N(C₂H₅)-C₆H₄-m-CH₃ | H | pink |
| 59 | 1-NHCH₃ | 4 | H | H | violet |
| 60 | 1-NHC₂H₄OH | 4 | H | H | red violet |
| 61 | 1-NHCOCH₃ | 4 | -COCH₃ | H | orange-yellow |
| 62 | 1-NHC₆H₅ | 4 | -C₆H₅ | H | Violet |
| 63 | 1-NHCOC₆H₅ | 4 | H | -CH₃ | yellow |
| 64 | 1-NH₂-2-CH₃ | 4 | H | H | pink |
| 65 | 1-NH₂-2-OCH₃ | 4 | -C₂H₅ | H | orange-red |
| 66 | 1-NH₂-2-OC₂H₄OCH₃ | 4 | H | H | orange-red |
| 67 | 1-NH₂-2-SCH₃ | 4 | H | H | red |
| 68 | 1-NH₂-2-SCH₃ | 4 | -C₂H₅ | H | red |
| 69 | 1-NH₂-2-SO₂N(CH₃)₂ | 4 | H | H | pink |
| 70 | 1-NH₂-2-SO₂N(CH₃)₂ | 4 | -C₂H₅ | H | pink |
| 71 | 1-NH₂-2-SO₂NC₂H₄OC₂H₄- | 4 | H | H | pink |
| 72 | 1-NH₂-SO₂NC₂H₄OC₂H₄- | 4 | -C₂H₅ | H | pink |
| 73 | 1-OH | 4 | H | H | yellow |
| 74 | 1-OH | 4 | -C₂H₅ | H | yellow |
| 75 | 1NO₂ | 5 | -C₂H₅ | H | yellow |
| 76 | 1-NO₂ | 5 | H | H | yellow |
| 77 | 1-NH₂ | 5 | H | H | orange-yellow |
| 78 | 1,8-di-NH₂-4-Cl | 5 | H | H | violet |
| 79 | 1,8-di-NH₂-4-SCH₃ | 5 | H | H | blue-violet |
| 80 | 1-NHC₆H₄-p-C₂H₄OH | 8 | H | H | blue |
| 81 | 1-NH₂ | 2,4 | -CH₃ | H | pink |
| 82 | 1-NH₂ | 2,4 | -C₂H₅ | H | pink |
| 83 | 1-NH₂ | 2,4 | -CH₂CH₂OH | H | pink |
| 84 | 1-NH₂ | 2,4 | -CH₂COCH₃ | H | pink |
| 85 | 1-NH₂ | 2,4 | -C₂H₄OC₂H₅ | H | pink |
| 86 | 1-NH₂ | 2,4 | -CH₂CH₂CN | H | pink |
| 87 | 1-NH₂ | 2,4 | -CH₂CH₂CN | -C₆H₄-p-CH₃ | pink |
| 88 | 1-NH₂ | 2 4 | -CH₂COCH₃ -CH₂CONH₂ | H H | pink |
| 89 | 1-OH | 2,4 | H | H | orange-brown |
| 90 | None | 1,4 | H | H | yellow |
| 91 | None | 1,5 | -C₂H₅ | H | greenish yellow |
| 92 | None | 1,5 | -C₂H₅ | -CH₃ | greenish yellow |
| 93 | None | 1,8 | H | H | yellow |
| 94 | 1,8-di-OH-4,5-di-NH₂ | 2,7 | H | H | blue |
| 95 | 1,8-di-NH₂ | 4,5 | H | H | violet |
| 96 | 1,5-di-OH | 4,8 | H | H | pink |
| 97 | 1-NHSO₂C₆H₅-2-SO₂NCH₂CH₂OCH₂CH₂ | 4 | -C₂H₄OOCCH₃ | -C₂H₅ | pink |
| 98 | 1-NHCH(CH₃)₂-2-OCH₂CH₂O-C₆H₄-p-OCH₂CH₂OH | 4 | -CH₃ | | pink |

| | | | | | |
|---|---|---|---|---|---|
| 99 | 1-OC₂H₅-2-OCH₂CH₂-NCOCH₂CH₂CH₂CO | 4 | -COOC₂H₅ | H | orange-yellow |
| 100 | 1-NH₂-2-CONHC₂H₅ | 4 | H | H | pink |
| 101 | 1-NCH₆H₁₁-2-SO₂NCH₂CH₂SO₂CH₂CH₂ | 4 | -CH₂CH₂SO₂-CH₂ CH₂ | H | pink |
| 102 | None | 1,4 | -CH₂CH₂CN | -C₆H₄-p-OCH₃ | yellow |
| 103 | None | 1 4 | -C₂H₅ -C₂H₅ | -C₆H₅ H | yellow |
| 104 | 5,8-di-NH₂ | 1,4 | -CH₂C₆H₄-p-CH₃ | H | violet |
| 105 | 5-OH-8-NH₂ | 1,4 | -C₂H₅ | H | red |
| 106 | 5,8-di-OH | 1,4 | H | H | orange |
| 107 | 5-NHCOOC₂H₅ | 1,4 | -CH₂CH₂SO₂NH₂ | H | orange |
| 108 | 1-NH₂ | 4,8 | H | H | red |
| 109 | 1NO₂ | 4,5 | -CH₃ | -C₄H₉ | yellow |
| 110 | 1-NHSO₂C₆H₄-p-CH₃-5,8-di-NH₂ | 4 | H | H | violet |
| 111 | 1,5,8-tri-NH₂ | 4 | -CH₂CH(OH)C₆H₅ | H | blue |
| 112 | 1-Cl | 4,5 | H | -CH₃ | yellow |
| 113 | 1-SC₄H₉ | 2 | H | -CH₃ | orange |
| 114 | 1-SC₆H₅-5,8-di-NH₂ | 2 | H | -CH₃ | violet |
| 115 | 1,4,5,8-tetra-NH₂ | 2 | H | H | blue |
| 116 | None | 1,4,5,8 | H | H | orange |
| 117 | 1-NHC₆H₅-4-NHSO₂-C₆H₄-p-CH₃-5,8-di-OH | 2 | H | -C₂H₅ | blue |
| 118 | 1-NH₂-4OH | 2 | -CH₂CH₂SO₂CH=CH₂ | | violet |
| 119 | 1-NH₂-4OH | 2 | -CH₂CH(CH₃)COOCH₃ | | violet |
| 120 | 1-NH₂-4OH | 2 | CH₂CH(CH₃)CNOC₂H₅ | | violet |
| 121 | 1-NHC₆H₅-4-OH | 2 | H | -C₆H₄-p-OC₂H₅ | violet |
| 122 | 4-NHC₆H₅-1-OH | 2 | -C₂H₅ | -SC₆H₅ | violet |
| 123 | 1-NH₂-4-NHC₆H₄ | 2 | -C₂H₅ | -SC₄H₉ | blue |
| 124 | 1,4-di-NHC₆H₅ | 2 | -C₂H₅ | -OC₂H₄OCH₃ | blue |
| 125 | 1NH₂-4-NHSO₂CH₃ | 2 | -CH₂CO-OCH₃ | -C₆H₄-p-OCH₃ | blue-violet |
| 126 | 1-NH₂ | 4 | -CH₂CH₂CH₂S-CH₂-COOC₂H₅ | H | pink |
| 127 | 1-NH₂ | 4 | -CH₂CH₂OSO₂-C₆H₄-p-CH₃ | H | pink |
| 128 | 1-NH₂ | 4 | -C₂H₅ | -CH₂CH₂S-C=N-o-C₆H₄S | pink |
| 129 | 1-NH₂ | 4 | H | -CH₂CH₂CN | pink |
| 130 | 1-NH₂ | 4 | -CH₂-CH₂CH₂-COOC₆H₅ | -CH₂CH₂-SCH₃ | pink |
| 131 | 1-NH₂ | 4 | -C₂H₅ | -CH₂CH₂-SO=N-NH-CH=N | pink |
| 132 | 1-NH₂ | 4 | -C₂H₅ | -CH=CH-C=N-C₆H₄-o-O | pink |
| 133 | 1-NHCOCH₃ | 4 | -C₂H₅ | -C₂H₅ | red |
| 134 | 1-NHSO₂CH₃ | 4 | H | -C₆H₄-p-CH₃ | red |
| 135 | 1-NHSO₂C₆H₄-p-CH₃ | 4 | -C₂H₅ | H | red |
| 136 | 1-NHCH₃ | 4 | -CH₂CH₂-NCOC₂H₄CO | H | pink |
| 137 | 1-NHC₆H₅ | 4 | -CH₂CH₂CN | -CH₃ | pink |
| 138 | 1-NH₂-2-SO₂NH₂ | 4 | -C₂H₅ | H | pink |
| 139 | 1-NH₂-2-SO₂NH₂ | 4 | -CH₂CH₂SO₂-CH=CH₂ | H | pink |
| 140 | 1-NHSO₂-2-OCH₂CH₂OCH₃ | 4 | -CH₂COC₆H₅ | H | red |
| 141 | 1-NH₂-2-OCH₂CHCH₂CH₂CH(CH₂OH)O | 4 | -CH₂CH₂OC₂H₅ | H | pink |
| 142 | 1,5,8-tri-NH₂ | 4 | -CH₂COC₆H₅ | H | blue |
| 143 | 1,4-di-OH-2-NHC₆H₅ | 5 | -CH₂CH₂OC₂H₅ | H | orange |
| 144 | None | 1,5 | -CH₂CH₂CH₂-C=CHCH=CHO | H | yellow |

The designation in Table I that the group —ST resides at more than one position on the anthraquinone nucleus means that a corresponding number of triazolylthio groups are attached to the anthraquinone group. For example, the anthraquinone compound of Example 103 is 1-(1-ethyl-1H-1,2,4-triazolythio)-4-(1=ethyl-5-penyl-1H-1,2,4-triazol-3-ylthio)anthraquinone. The following compounds further illustrate the novel compounds of the invention.

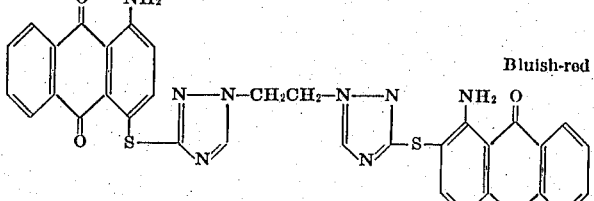

Example 145

Bluish-red

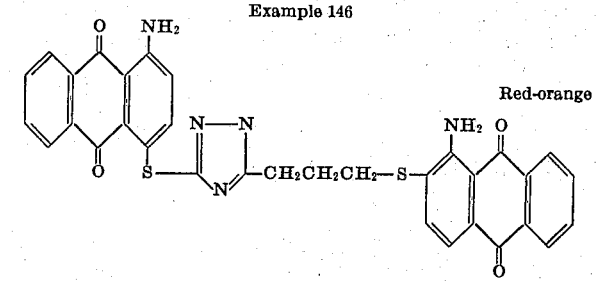

Example 146

Red-orange

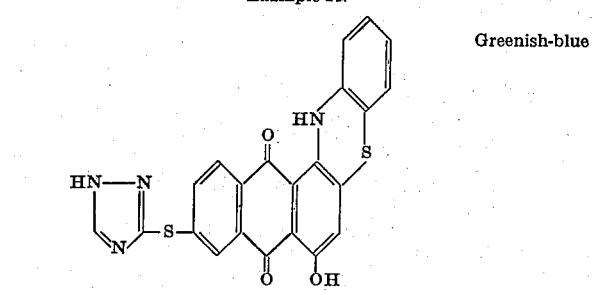

Example 147

Greenish-blue

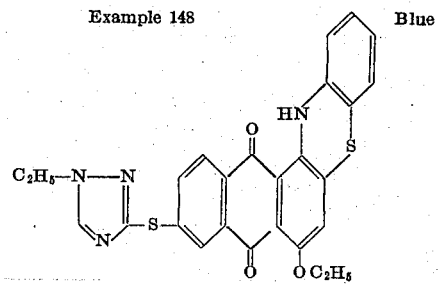

Example 148

Blue

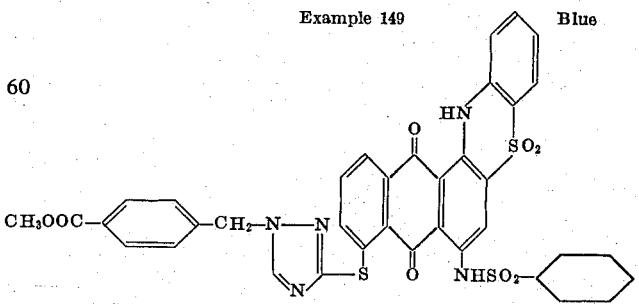

Example 149

Blue

Example 150

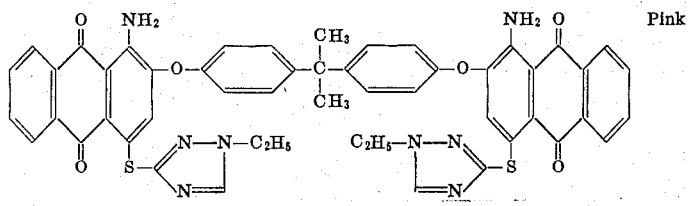

Pink

The compounds of Table II, which conform to the formula A-R-ST wherein —T is a triazolyl radical having the structure

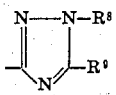

also are prepared by procedures similar to those employed in Examples 1 through 22.

TABLE II

| ex. no. | Substituents on Anthraquinone Nucleus A | R | R⁸ | R⁹ | Color |
|---|---|---|---|---|---|
| 151 | 1-NH₂-4-OH | 2-OCH₂CH₂- | H | H | pink |
| 152 | 1-NH₂-4-OH | 2-OCH₂CH₂- | -CH₂CH₂SO₂CH₂CH₂ | H | pink |
| 153 | 1-NH₂-4-OH | 2-(OCH₂CH₂-)₂- | -C₂H₅ | H | pink |
| 154 | 1-NH₂-4-OH | 2-(OCH₂CH₂-)₂- | -CH₂COC₆H₅ | H | pink |
| 155 | 1-NH₂-4-OH | 2-O(CH₂)₄- | H | H | pink |
| 156 | 1-NH₂-4-OH | 2-O(CH₂)₄- | -C₂H₅ | H | pink |
| 157 | 1-NH₂-4-NHSO₂C₆H₄-p-OCH₃ | 2-O(CH₂CH₂)₂ | -C₂H₅ | H | pink |
| 158 | 1-NH₂-4-S-C=N-NH-CH=N | 2-SO₂NHC₆H₄-p-CH₂- | H | H | pink-violet |
| 159 | 1-NH₂-4-S-C=N-NH-C(C₂H₅)= | 2-SO₂NHC₆H₄-N-OCH₂CH₂- | -C₂H₅ | H | pink-violet |
| 160 | 1-NHCH₃ | 4-NH-C₆H₄-p-OC₂H₄- | H | H | blue |
| 161 | 1-NHC₆H₄-m-OCH₃-4-OH | 2-OCH₂C₆H₁₀CH₂- | -CH₂CH₂CN | H | pink |
| 162 | 1,4-di-NH₂ | 2-OCH₂CH₂-C₆H₄-p-CH₂CH₂- | -CH₂C₆H₅ | H | blue-violet |
| 163 | 1,8-di-OH-5-NO₂ | 4-NHCH₂CH₂- | -C₂H₅ | H | blue |
| 164 | 1,4-di-OH | 5,8-di-NHCH₂CH₂- | H | H | blue |
| 165 | 1,4-di-OH | 5,8-di-NHCH₂CH₂- | -C₂H₅ | H | blue |
| 166 | 1-NH₂-4-OH | 2-(OCH₂CH₂)₂- | -(CH₂O)₂C₆H₅ | H | pink |
| 167 | 1-NHCH₃ | 4-NHC₆H₄-p-OC₂H₄- | H | -CH₃ | blue |
| 168 | 1-NH₂-4-OH | 2-(OCH₂CH₂)₂- | -CH₃ | -C₆H₅ | pink |
| 169 | 1-NH₂-4-OH | 2-OC₆H₄-p-CH₂- | -C₂H₅ | -CH₃ | pink |
| 170 | 1-NH₂-4-NHSO₂CH₃ | 2-SCH₂CH₂- | H | H11 | violet |
| 171 | 1-OH-4-NHC₆H₄-m-NCH₂CH₂CH₂CO | 2-OCH₂CH₂- | H | H | pink |
| 172 | 1-NH₂-4-OH | 2-O(CH₂)₃- | -C₂H₅ | -CH₃ | pink |
| 173 | 1-NH₂-4-NHSO₂CH₃ | 2-OC₆H₄-p-CH₂- | -CH₂-CH₂OC₂H₅ | H | pink |
| 174 | 1-NH₂-4-NHSO₂C₆H₄-p-CH₃ | 2-O(CH₂)₄- | -CH₃ | H | pink |
| 175 | 1-NHCH₃ | 2-NHC₆H₄-p-OCH₂CH₂- | -CH₂COC₆H₅ | H | orange-yellow |
| 176 | 1-NH₂-2-OCH₂CH₂CH₂OC₂H₅ | 4-NHC₆H₄-CH₂- | H | H | blue-yellow |
| 177 | None | 1,4,5,8-tetra-NH- | H | H | Green |
| 178 | 1-OH-2-CN | 4-NHSO₂CH₂CH₂- | -CH₃ | H | pink |

The compounds of Table II wherein R represents more than one organic radical means that the compound contains one triazolylthio group attached to each of the organic radicals represented by R. For example, the compound of Example 164 is 1,4-dihydroxy-5,8-di[2-(1H-1,2,4-triazol-3-ylthio)ethylamino]-anthraquinone.

The novel anthraquinone compounds of the invention have been described in detail with particular reference to preferred embodiments thereof, but it will be understood that variations and modifications thereof can be effected within the spirit and scope of the invention.

The compounds of the invention can be used for dyeing hydrophobic textile materials in the manner described in U.S. Pat. Nos. 2,880,050; 2,757,064; 2,782,187; and 3,043,827. The compounds can be applied to such materials from aqueous dyebaths at temperatures of from about 80° to 100° C. at atmospheric or superatmospheric pressures. Various carriers, surfactants, and dispersing agents also can be present in the dyebath if desired. The dyeing techniques described in U.S. Pat. No. 3,313,590 can be employed, using various solvents and carriers such as o-phenylphenol, biphenyl, butyl benzoate, methyl naphthalene, etc. The following examples illustrate procedures for applying the novel anthraquinone compounds to hydrophobic textile materials.

EXAMPLE 179

The triazolylthioanthraquinone compound of Example 4 (0.1 g.) is dissolved in 10 cc. of 2-methoxyethanol. A small amount (3–5 cc.) of a 3 percent sodium lignin sulfonate aqueous solution is added, with stirring, and then the volume of the bath is brought to 300 cc. with water. 3 cc. of an anionic solvent carrier (Tanavol) is added to the bath and 10 grams of a textile fabric made of poly(ethylene terephthalate) fibers is placed in the bath and worked 10 minutes without heat. The dyeing is carried out at the boil for one hour. The dyed fabric is removed from the dyebath and scoured for 20 minutes at 80° C. in a solution containing 1 g./l. neutral soap and 1 g./l. sodium carbonate. The fabric is then rinsed, dried in an oven at 250° F. and heat set (for removal of residual carrier) for 5 minutes at 350° C.

EXAMPLE 180

0.1 g. of the anthraquinone product obtained in Example 7 is dissolved in 10 cc. of 2-methoxyethanol. A small amount (3–5 cc.) of a 3 percent sodium lignin sulfonate aqueous solution is added, with stirring, and then the volume of the bath is brought to 300 cc. with water. 10 g. of a textile fabric made of partially hydrolyzed, cellulose acetate fibers (ESTRON fibers) is placed in the bath, worked for 10 minutes without heat, and then the bath is slowly brought to 80° C. and the dyeing is continued for 1 hour. The dyed fabric is removed from the dyebath and scoured for 20 minutes at 80° C. in a solution containing 1 g./l. neutral soap and 1 g./l. sodium carbonate. The fabric is then rinsed and dried.

The dyeing procedure described in Example 180 can be employed in the application of the novel anthraquinone compounds to polyamide textile materials except that the dyeing is carried out at the boil rather than at 80° C.

The compounds of the invention can also be applied to polyester textile materials by the heat fixation technique described in U.S. Pat. No. 2,663,612 and in the American Dyestuff Reporter, 42, 1 (1953). The following procedure describes how the compounds of the invention can be applied to polyester materials by the heat fixation technique.

EXAMPLE 181

A mixture of:

500 mg. of the compound of Example 34, 150 mg. of a sodium lignosulfonate dispersing agent (Marasperse N), 150 mg. of a partially desulfonated sodium lignosulfonate (Marasperse CB), 0.5 ml. glycerin, and 1.0 ml. of water is ground in a microsize container (an accessory for a 1-quart size Szegvari Attritor) for approximately 3.5 hours. Enough ⅛-inch stainless steel balls are added to provide maximum grinding. When the grinding is complete, the entire contents are poured into a beaker and 100 ml. of water are used to wash the remaining dye paste from the micro-container. The dye paste is then heated slowly to 65° C. with continuous stirring.

A thickener and penetrating mixture is prepared by mixing 1 ml. of a complex diaryl sulfonate surfactant, (compound 8-S), 3 ml. of a 3 percent solution of a sodium N-methyl-N-oleoyltaurate (Igepon T-sl), 8 ml. of a 25 percent solution of natural gums (Superclear 8ON), and sufficient water to bring the volume to 100 ml. The thickener and penetrating mixture is added to the dye paste, the volume is adjusted to 200 ml. and the mixture is agitated for 15 minutes. The dye mixture is then filtered through folded cheesecloth to remove the stainless steel balls and it then is added to the reservoir of a Butterworth padder where it is heated to about 45°–60° C.

10 g. of a fabric of poly(ethylene terephthalate) fibers and 10 g. of a fabric of 65/35 spun poly(ethylene terephthalate)/cotton fibers are sewn together, end-to-end, and padded for 5 minutes of continuous cycling through the dye mixture and between three rubber squeeze rollers of the padder. Dye mixture pick-up is about 60 percent based on the weight of the fabrics.

The padded fabrics are then dried at 200° F. and then heat-fixed for 2 minutes at 415° F. in a forced air oven. The dyed fabrics are scoured for 20 minutes at 65°–70° C. in a solution containing 0.2 percent sodium hydrosulfite, 0.2 percent sodium carbonate and 1.7 percent of a 3 percent solution of sodium N-methyl-N-oleoyltaurate and then dried. The dyed fabrics possess excellent brightness and exhibit outstanding fastness to light and sublimation when tested according to the procedures described in the 1966 edition of the Technical Manual of the American Association of Textile Chemists and Colorists.

The heat fixation dyeing procedure described above can be varied by the substitution of other dispersing agents, surfactants, suspending agents, thickeners, etc. The temperature and time of the heat-fixation step can also be varied.

Polymeric linear polyester materials of the terephthalate sold under the trademarks "Kodel," "Dacron" and "Terylene" are illustrative of the linear aromatic polyester textile materials that can be dyed with the compounds of our invention. Examples of linear polyester textile materials that can be dyed with the compounds of the invention are those prepared from ethylene glycol and dimethylterephthalate or from cyclohexanedimethanol and dimethylterephthalate. Polyesters prepared from cyclohexanedimenthanol and dimethylterephthalate are more particularly described in U.S. Pat. No. 2,901,446. Poly(ethylene terephthalate) polyester fibers are described, for example, in U.S. Pat. No. 2,465,319. The polymeric linear polyester materials disclosed in U.S. Pats. Nos. 2,945,010; 2,957,745; and 2,989,363, for example, can be dyed. The linear aromatic polyester materials specifically named have a melting point of at least 200° C. The poly(ethylene terephthalate) fibers which are dyed with the compounds of the invention are manufactured from a melt of a polymer having an inherent viscosity of at least 0.35 and preferably, about 0.6. The inherent viscosity of the poly(1,4-cyclohexylenedimethylene terephthalate) polymer is also at least 0.35. These inherent viscosities are measured at 25° C. using 0.25 g. polymer per 100 ml. of a solvent consisting of 60 percent phenol and 40 percent tetrachloroethane. The polyester fabrics, yarns, fibers and filaments that are dyed with the novel compounds can also contain minor amounts of other additives such as brighteners, pigments, delusterants, inhibitors, stabilizers, etc.

Examples of the polyamide textile materials that can be dyed with the novel anthraquinone compounds are those consisting of nylon 66, made by the polymerization of adipic acid and hexamethylenediamine, nylon 6, prepared from epsilon-aminocaproic acid lactam, and nylon 8. Fibers, yarns and fabrics prepared from either unhydrolyzed or partially-hydrolyzed cellulose acetate can be dyed with the compounds of the invention.

The novel anthraquinone compounds can be converted to the corresponding cationic compounds by treating the novel com-pounds with an alkylating agent at elevated temperatures and/or pressure. The cationic compounds prepared from the compounds of the invention are useful as dyes for modacrylic, acrylic and acid-modified polyester textile materials. The following example illustrates the alkylation of the novel compounds to prepare the analogous cationic compounds.

EXAMPLE 154

1-Amino-4-(1H-1,2,4-triazol-3-ylthio)anthraquinone (1.0 g.), 5 ml. of DMF and 15 ml. of dimethyl sulfate are heated on a steam bath for 20 minutes. The reaction mixture is drowned in water and the product is precipitated by the addition of sodium iodide. The product produces a violet shade on acrylic and modacrylic fibers and has the structure:

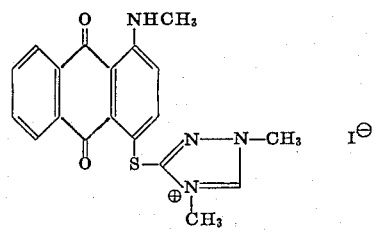

We claim:

1. A compound having the formula wherein

C and D are the same or different and each is hydrogen, hydroxy, lower alkoxy, amino, lower alkylamino, lower alkylsulfonamido, cyclohexylsulfonamido, lower alkanoylamino, lower alkoxycarbonylamino, a group having the formula —NHAr, —NHSO₂Ar, or —NHCOAr wherein Ar is phenyl or phenyl substituted with lower alkyl, lower alkoxy, or halogen, or a group having the formula R⁸ is hydrogen; lower alkyl; lower alkyl substituted with cyano, hydroxy, halogen, lower alkoxy, carbamoyl, lower alkanoyloxy, lower alkoxycarbonyl, lower dialkylamino, benzoyl, succinimido, glutarimido, phthalimido, phenyl, lower alkylphenyl, lower alkoxyphenyl, halophenyl; or lower alkoxycarbonylphenyl; cyclohexyl; lower alkylcyclohexyl; lower alkanoyl; or lower alkylsulfonyl; and R⁹ is hydrogen, lower alkyl, phenyl, or phenyl substituted with lower alkyl, lower alkoxy, or halogen.

2. A compound according to claim 1 wherein

C and D are the same or different and each is hydrogen, hydroxy, amino, lower alkylamino, anilino, lower alkylsulfonamido, phenylsulfonamido, or tolylsulfonamido;

R⁸ is hydrogen, lower alkyl, cyanoethyl, benzyl, or cyclohexyl; and

R⁹ is hydrogen, lower alkyl or phenyl.

3. A compound according to claim 1 wherein

C and D are the same or different and each is hydrogen, hydroxy, or amino;

R⁸ is hydrogen, lower alkyl, cyanoethyl, benzyl or cyclohexyl; and

R⁹ is hydrogen.

4. A compound having the formula wherein

E is hydrogen, halogen, nitro, hydroxy, lower alkoxy, amino, lower alkylamino, lower alkylsulfonamido, cyclohexylsulfonamido, lower alkanoylamino, lower alkoxycarbonylamino, or a group having the formula —NHAr, —NHSO₂Ar, or —NHCOAr wherein Ar, is phenyl or phenyl substituted with lower alkyl, lower alkoxy or halogen;

L and K are the same or different and each is hydrogen, nitro, hydroxy, lower alkoxy, amino, lower alkylamino, lower alkylsulfonamido, cyclohexylsulfonamido, lower alkanoylamino, lower alkoxycarbonylamino, or a group having the formula —NHAr, —NHSO₂Ar, or —NHCOAr wherein Ar is phenyl or phenyl substituted with lower alkyl, lower alkoxy, or halogen, or one of L and K is a group having the formula R⁸ is hydrogen; lower alkyl; lower alkyl substituted with cyano, hydroxy, halogen, lower alkoxy, carbamoyl, lower alkanoyloxy, lower alkoxycarbonyl, lower dialkylamino, benzoyl, succinimido, glutarimido, phthalimido, phenyl, lower alkylphenyl, lower alkoxyphenyl, halophenyl; or lower alkoxycarbonylphenyl; cyclohexyl; lower alkylcyclohexyl; lower alkanoyl; or lower alkysulfonyl; and R⁹ is hydrogen, lower alkyl, phenyl, or phenyl substituted with lower alkyl, lower alkoxy, or halogen.

5. A compound according to claim 4 wherein

E is hydrogen, hydroxy, amino, lower alkylamino, anilino, lower alkylsulfonamido, phenylsulfonamido, or tolysulfonamido;

L and K are the same or different and each is hydrogen, hydroxy, amino, lower alkylamino, anilino, lower alkylsulfonamido, phenylsulfonamido, or tolylsulfonamido, or one of L and K is a group having the formula R⁸ is hydrogen, lower alkyl, cyanoethyl, benzyl, or cyclohexyl; and R⁹ is hydrogen, lower alkyl or phenyl.

6. A compound according to claim 4 wherein

E is hydrogen, hydroxy or amino;

L and K are the same or different and each is hydrogen, hydroxy, or amino, or one of L and K is R⁸ is hydrogen, lower alkyl, cyanoethyl, benzyl, or cyclohexyl; and R⁹ is hydrogen.

7. A compound according to claim 4 having the formula

8. A compound according to claim 4 having the formula

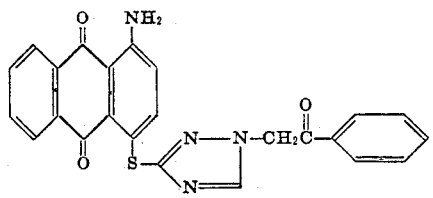

9. A compound having the formula

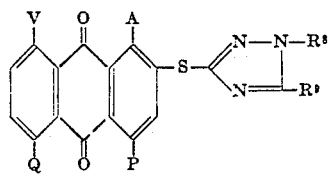

wherein
- A is hydroxy, lower alkoxy, amino, lower alkylamino, lower alkylsulfonamido, cyclohexylsulfonamido, lower alkanoylamino, lower alkoxycarbonylamino, or the group having the formula —NHAr, —NHSO$_2$Ar, or —NHCOAr wherein Ar is phenyl or phenyl substituted with lower alkyl, lower alkoxy, or halogen;
- P is hydrogen, hydroxy, lower alkoxy, amino, lower alkylamino, lower alkylsulfonamido, cyclohexylsulfonamido, lower alkanoylamino, lower alkoxycarbonylamino, or a group having the formula —SAr, —NHAr, —NHSO$_2$Ar or —NHCOAr wherein Ar is phenyl or phenyl substituted with lower alkyl, lower alkoxy or halogen;
- Q and V are the same or different and each is hydrogen, lower alkoxy, amino, lower alkylamino, lower alkylsulfonamido, cyclohexylsulfonamido, lower alkanoylamino, lower alkoxycarbonylamino, or a group having the formula —NHAr, —NHSO$_2$Ar or —NHCOAr wherein Ar is phenyl or phenyl substituted with lower alkyl, lower alkoxy, or halogen;
- R$^8$ is hydrogen; lower alkyl; lower alkyl substituted with cyano, hydroxy, halogen, lower alkoxy, carbamoyl, lower alkanoyloxy, lower alkoxycarbonyl, lower dialkylamino, benzoyl, succinimido, glutarimido, phthalimido, phenyl, lower alkylphenyl, lower alkoxyphenyl, halophenyl; or lower alkoxycarbonylphenyl; cyclohexyl; lower alkylcyclohexyl; lower alkanoyl; or lower alkylsulfonyl; and
- R$^9$ is hydrogen, lower alkyl, phenyl, or phenyl substituted with lower alkyl, lower alkoxy, or halogen.

10. A compound according to claim 9 wherein
- A is hydroxy or amino;
- P is hydrogen, hydroxy, amino, lower alkylamino, anilino, lower alkylsulfonamido, phenylsulfonamido, or tolylsulfonamido;
- Q and V are the same or different and each is hydrogen, hydroxy, or amino;
- R$^8$ is hydrogen, lower alkyl, cyanoethyl, benzyl or cyclohexyl; and
- R$^9$ is hydrogen, lower alkyl or phenyl.

11. A compound according to claim 9 having the formula

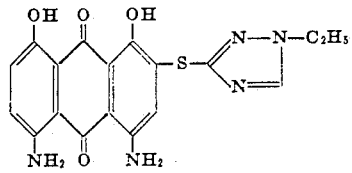

12. A compound according to claim 9 having the formula

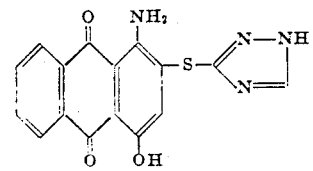

13. A compound according to claim 4 having the formula

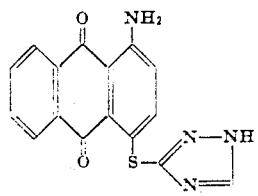

* * * * *